United States Patent
Aguilar-Simon et al.

(10) Patent No.: US 11,790,275 B2
(45) Date of Patent: Oct. 17, 2023

(54) ADAPTIVE CONTINUOUS MACHINE LEARNING BY UNCERTAINTY TRACKING

(71) Applicant: Teledyne Scientific & Imaging, LLC, Thousand Oaks, CA (US)

(72) Inventors: Mario Aguilar-Simon, Chapel Hill, NC (US); Andrew Paul Brna, Morrisville, NC (US); Ryan Charles Brown, Raleigh, NC (US); Patrick Martin Connolly, Cary, NC (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 386 days.

(21) Appl. No.: 16/851,426

(22) Filed: Apr. 17, 2020

(65) Prior Publication Data

US 2020/0334579 A1   Oct. 22, 2020

Related U.S. Application Data

(60) Provisional application No. 62/835,777, filed on Apr. 18, 2019.

(51) Int. Cl.
*G06K 9/62* (2022.01)
*G06N 20/10* (2019.01)
(Continued)

(52) U.S. Cl.
CPC ............. *G06N 20/10* (2019.01); *G06F 18/22* (2023.01); *G06F 18/2413* (2023.01);
(Continued)

(58) Field of Classification Search
CPC .. G06K 9/6201; G06K 9/6215; G06K 9/6217; G06K 9/6222; G06K 9/6262; G06K 9/6264; G06K 9/6269; G06K 9/627; G06V 10/454; G06V 10/70; G06V 10/74; G06V 10/761; G06V 10/762; G06V 10/764; G06V 10/82; G06V 10/778; G06V 10/7788; G06T 2207/20081; G06T 2207/20084; G06N 3/02; G06N 3/04; G06N 3/0445; G06N 3/0454; G06N 3/0472; G06N 3/049; G06N 3/08; G06N 3/082; G06N 3/084; G06N 3/086; G06N 3/088; G06N 20/00;
(Continued)

(56) References Cited

U.S. PATENT DOCUMENTS 8,374,983 B1 *   2/2013   Pohl ...................... G06F 16/954
                                                           706/46
10,325,223 B1 *  6/2019   Arel ....................... G06N 3/084
(Continued)

OTHER PUBLICATIONS

Carpenter et al., "A Massively Parallel Architecture for a Self-Organizing Neural Pattern Recognition Machine," Computer Vision, Graphics, and Image Processing, vol. 37, 1987, pp. 54-115.
(Continued)

*Primary Examiner* — Eric Rush
(74) *Attorney, Agent, or Firm* — K&L Gates LLP

(57) ABSTRACT

Systems and methods for a machine learning system to learn a new skill without catastrophically forgetting an existing skill and to continually learn in a self-supervised manner during operation, without human intervention.

39 Claims, 8 Drawing Sheets

(51) Int. Cl.
*G06N 3/04* (2023.01)
*G06F 18/22* (2023.01)
*G06F 18/2413* (2023.01)
*G06V 10/778* (2022.01)
*G10L 15/30* (2013.01)
*G06V 10/70* (2022.01)
*G10L 17/08* (2013.01)
*G06V 10/74* (2022.01)
*G06F 18/243* (2023.01)
*G06F 18/25* (2023.01)
*G10L 15/10* (2006.01)

(52) U.S. Cl.
CPC ...... *G06F 18/24317* (2023.01); *G06F 18/254* (2023.01); *G06N 3/04* (2013.01); *G06V 10/70* (2022.01); *G06V 10/761* (2022.01); *G06V 10/7788* (2022.01); *G10L 15/10* (2013.01); *G10L 15/30* (2013.01); *G10L 17/08* (2013.01)

(58) Field of Classification Search
CPC ........ G06N 20/10; G06N 20/20; G06N 3/044; G06N 3/045; G06N 3/047; G06N 3/091; G06N 3/0985; G10L 15/06; G10L 15/063; G10L 15/065; G10L 15/07; G10L 15/075; G10L 15/083; G10L 15/10; G10L 15/16; G10L 15/28; G10L 15/30; G10L 15/32; G10L 17/04; G10L 17/06; G10L 17/08; G10L 17/10; G10L 17/18; G06F 18/20; G06F 18/217; G06F 18/2193; G06F 18/22; G06F 18/24; G06F 18/2413; G06F 18/24317; G06F 18/2433; G06F 18/24765; G06F 18/254; G06F 18/256
USPC ...... 382/155–159; 700/28–32, 44–50; 706/2, 706/8, 9, 12, 14–21, 25–32, 41–44; 704/202, 232, 243–245, 259
See application file for complete search history.

(56) References Cited

U.S. PATENT DOCUMENTS

| | | | |
|---|---|---|---|
| 11,295,173 B2* | 4/2022 | Umeno | G06V 10/82 |
| 2015/0254555 A1* | 9/2015 | Williams, Jr. | G06N 3/084 706/14 |
| 2017/0039469 A1* | 2/2017 | Majumdar | G06V 10/82 |
| 2017/0330109 A1* | 11/2017 | Maughan | G06N 20/00 |
| 2018/0204111 A1* | 7/2018 | Zadeh | G06V 10/82 |
| 2018/0285739 A1* | 10/2018 | Wu | G06N 3/08 |
| 2019/0205761 A1* | 7/2019 | Wu | G06N 3/084 |
| 2020/0247433 A1* | 8/2020 | Scharfenberger | G06V 10/82 |
| 2021/0206387 A1* | 7/2021 | Brahma | G06K 9/6259 |

OTHER PUBLICATIONS

Carpenter et al., "Normal and Amnesic Learning, Recognition and Memory by a Neural Model of Cortico-Hippocampal Interactions," Trends in Neurosciences, vol. 16, No. 4, 1993, pp. 131-137.
Carpenter et al., "Art 2: Self-Organization Of Stable Category Recognition Codes For Analog Input Patterns", Proc. SPIE vol. 848, Intelligent Robots and Computer Vision VI, 1987, pp. 272-280.

* cited by examiner

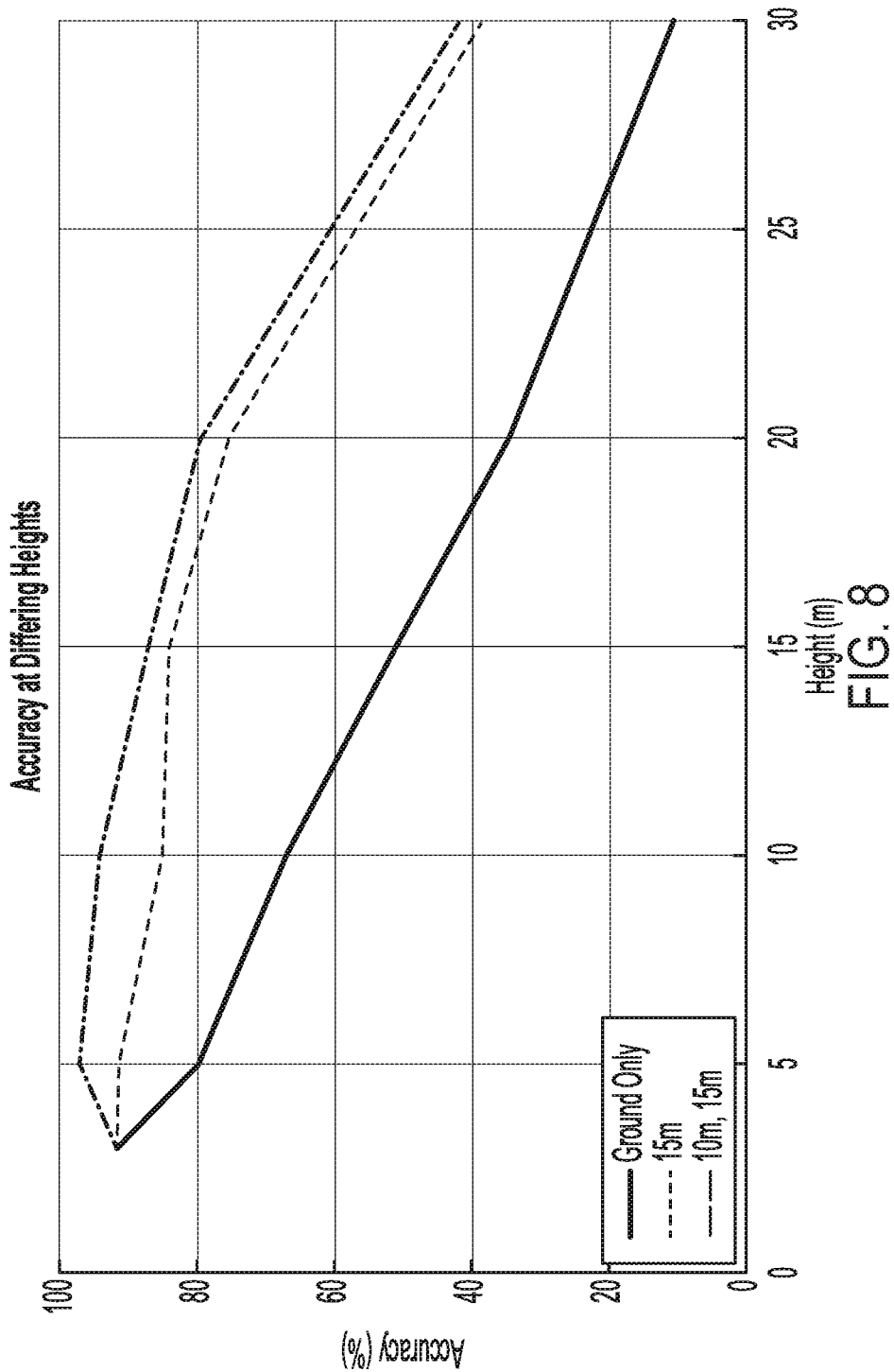

ADAPTIVE CONTINUOUS MACHINE LEARNING BY UNCERTAINTY TRACKING

CROSS-REFERENCES TO RELATED APPLICATIONS

This application claims the benefit of U.S. Provisional Patent Application Ser. No. 62/835,777 entitled ADAPTIVE CONTINUOUS MACHINE LEARNING BY UNCERTAINTY TRACKING filed on Apr. 18, 2019, which is entirely incorporated herein by reference.

STATEMENT REGARDING FEDERALLY SPONSORED RESEARCH OR DEVELOPMENT

This invention was made with government support under FA8650-18-C-7831 awarded by Defense Advanced Research Projects Agency. The government has certain rights in the invention.

BACKGROUND

Machine learning systems, as currently structured, are trained through exposure to huge numbers of labeled (supervised learning) or unlabeled (unsupervised learning) data examples. Through exposure to the data examples, the machine learning system learns to identify patterns within the data set so that the machine learning system can map an input to a desired output. Once the machine learning system is trained, no further changes can be made to the machine learning system without creating a risk that previously learned knowledge will be destroyed. This tendency of artificial neural networks and other machine learning systems to completely and abruptly forget previously learned information upon learning new information or structural changes being made to the machine learning system is referred to as catastrophic interference or catastrophic forgetting. As a result, once trained, a machine learning system cannot learn new information or adapt to new circumstances. In particular, currently existing machine learning algorithms must be completely retrained from scratch to alter hypotheses' representations or add new hypotheses. This means that a new machine learning system must be designed and/or an existing machine learning system must be retrained to adapt to changes in the operational environment. Accordingly, it would be desirable for a machine learning system to be able to modify its understanding of known information and to incorporate new information during operation, without the risk of catastrophic forgetting. Further, it would be desirable for a machine learning system to be able to perform these tasks without requiring human-labeled data examples so that the system could automatically adjust to new information and/or circumstances without requiring human intervention.

SUMMARY

In one general aspect, a system and method for continuous learning and adaptation by a machine learning system (e.g., for an autonomous system) such that the machine learning system is able to reconfigure itself to new situations and acquire new knowledge without human intervention.

In another general aspect, a system and method for a machine learning system to learn a new skill without catastrophically forgetting an existing skill and to continually learn in a self-supervised manner during operation, without human intervention.

FIGURES

The features of various aspects are set forth with particularity in the appended claims. The various aspects, however, both as to organization and methods of operation, together with further objects and advantages thereof, may best be understood by reference to the following description, taken in conjunction with the accompanying drawings as follows.

FIG. 8 is a graph of the performance on image data captured at various heights of machine learning systems trained on image data captured at particulars heights, including a machine learning system trained on image data captured at multiple different heights, in accordance with at least one aspect of the present disclosure.

DESCRIPTION

Certain aspects will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting example aspects and that the scope of the various aspects is defined solely by the claims. The features illustrated or described in connection with one aspect may be combined with the features of other aspects. Such modifications and variations are intended to be included within the scope of the claims. Furthermore, unless otherwise indicated, the terms and expressions employed herein have been chosen for the purpose of describing the illustrative aspects for the convenience of the reader and are not to limit the scope thereof.

Figure 1:
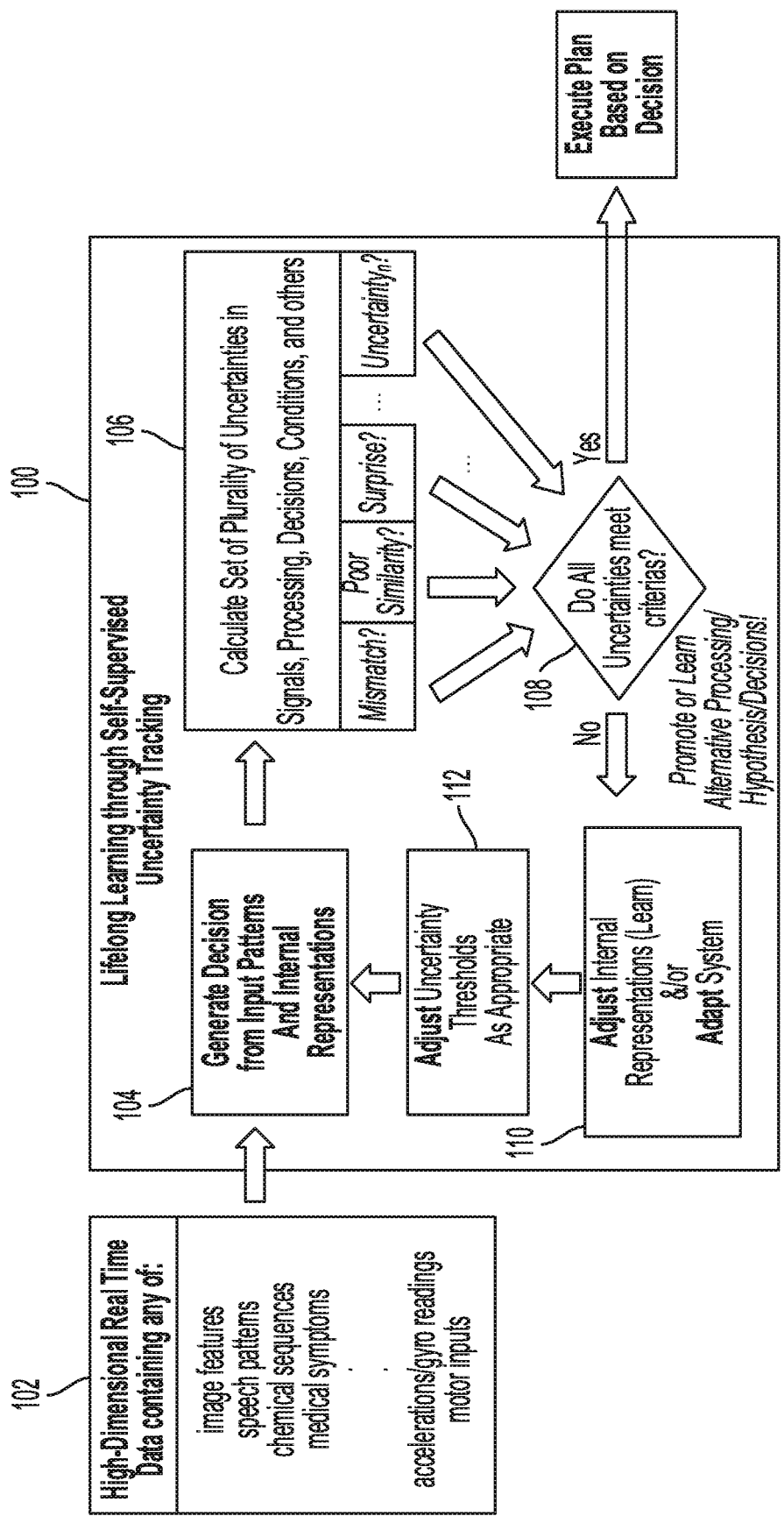
FIG. 1 is a logic flow diagram of a process for modulating a machine learning system, in accordance with at least one aspect of the present disclosure.
Figure 3:
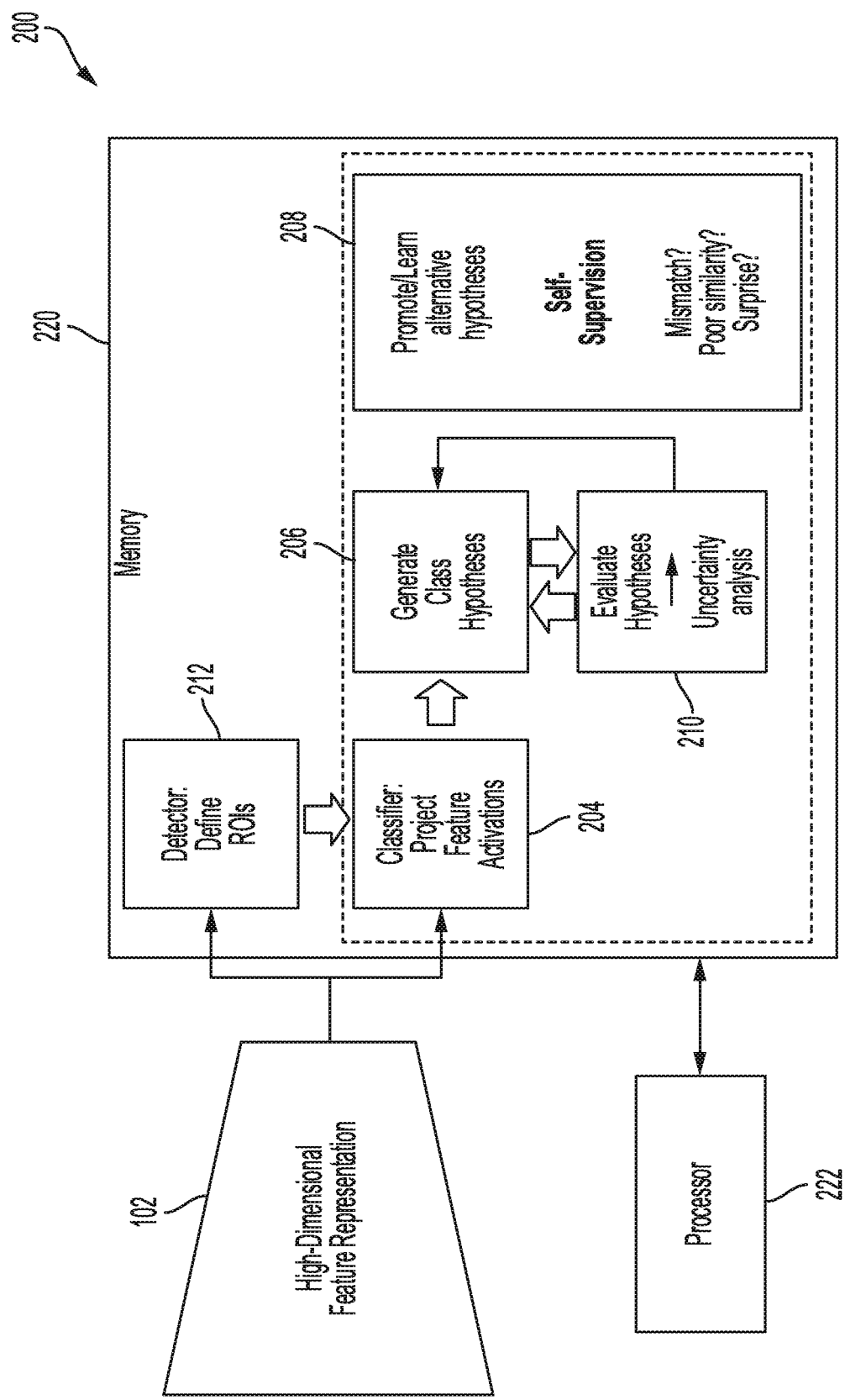
FIG. 3 is a block diagram of system configured to execute the process of FIGS. 1A or 1B, in accordance with at least one aspect of the present disclosure.

FIG. 1 is a logic flow diagram of a process 100 for modulating a machine learning system 204, in accordance with at least one aspect of the present disclosure. In the following description of the processes 100, reference should also be made to FIG. 3, which is a block diagram of a system 200 configured to execute the described process 100. In one aspect, the machine learning system 204 modulated by the process 100 has been trained to generate an output (e.g., a decision or hypothesis) that is based upon the input 102 and the internal representations of the machine learning system 204. In various aspects, the machine learning system 204 can include a classifier, as depicted in FIG. 3; however, in other aspects, the machine learning system 204 can include a variety of other types of machine learning algorithms or models. In aspects where the machine learning system 204 includes a classifier, the output can include a category or cluster to which the particular data item is assigned. In aspects where the machine learning system 204 includes other machine learning algorithms or models, the output can include any type of prediction, such as predictions generated by machine learning models for natural language processing, speech translation, motor planning and actuation, and so on. The machine learning system 204 can include a feedforward neural network (e.g., a convolutional neural network or a probabilistic neural network), a recurrent neural network, a support vector machine, and other machine learning algorithms or models. The machine learning system 204 and the steps of the flow diagram of the process 100 (and the process 150 described below) can be executed by a control circuit. For example, the machine learning system 204 and the functions described by the flow diagram of the process 100 can be embodied as computer-executable instructions stored in a memory 220 of a computer system that, when executed by a processor 222 coupled to the memory 220, cause the computer system to perform the described steps.

Accordingly, the system 200 executing the process 100 receives 104 the output from the machine learning system 204, which generates decisions (or "hypotheses") based upon the input 102 fed thereto and the internal representations of the machine learning system 204 (e.g., by the generate hypotheses module 206). The input 102 can include training data, developmental data, or operational data being processed during the runtime execution of the machine learning system 204. In one aspect, the system 200 can further include a detector 212 comprising a machine learning system configured to define regions of interest (ROIs) for guiding the task performed by the machine learning system 204.

Further, the system 200 analyzes or calculates 106 one or more uncertainty measures associated with the machine learning system 204 for the input 102. The system 200 can utilize a plurality of different uncertainty measures, either alone or in any combination with each other to determine whether to take various actions, such as adjusting the international representations of and/or adapting the machine learning system 204. In some aspects, the system 200 can be configured to compare output hypotheses to learned templates corresponding to the hypothesis types that the machine learning system 204 has been trained to recognize. These learned templates can include a set of features representing the recognized hypotheses. One set of illustrative techniques for generating and analyzing such learned templates can be embodied by applications of Adaptive Resonance Theory (ART), which is described in connection with, for example, G. Carpenter and S. Grossberg, "A massively parallel architecture for a self-organizing neural pattern recognition machine," *Comput. Vis. Graph. Image Process.*, vol. 37, pp. 54-115, 1987; G. Carpenter and S. Grossberg, "ART 2: Self-Organization Of Stable Category Recognition Codes For Analog Input Patterns," Proc. SPIE 0848, *Intelligent Robots and Computer Vision* VI, (19 Feb. 1988); and G. Carpenter and S. Grossberg, "Normal and amnesic learning, recognition and memory by a neural model of cortico-hippocampal interactions," TINS, vol. 16, no. 4, pp. 131-37, 1993. In ART (and related techniques), a set of input patterns is mapped to a set of hypotheses according to the features of the input patterns. By comparing new input patterns to the template for the hypothesis output by the machine learning system 204 in response to the input data item, the system 200 can quantify the "belongingness" for the input data item in the hypothesis type (e.g., the degree of certainty in the decision). In one aspect, the system 200 can include a first module 208 that is programmed to promote and learn alternative hypotheses based on various uncertainty thresholds and a second module 210 that is programmed to evaluate the hypotheses for the uncertainty analyses, which are described further below. However, the aforementioned techniques are simply for illustrative purposes and a variety of other techniques can be utilized to assess uncertainty.

As noted above, the system 200 can calculate one or more different uncertainty measures, including, but not limited to, the illustrative uncertainty measures discussed below. The system 200 can then compare the calculated uncertainty measures to respective thresholds for each uncertainty measure to determine whether to trigger various actions to modulate the machine learning system 204 or operate without any modulations applied to the machine learning system 204.

In one aspect, an uncertainty measure can include whether there is a mismatch between the input data item and the hypothesis type assigned by the machine learning system 204 (e.g., whether the input data item was assigned to an incorrect category for when the machine learning system 204 includes a classifier). The system 200 can determine that the input data item is mismatched by, for example, comparing the input data item to the templates for a series of hypotheses, quantifying the degree to which the features of the input data item correspond to each of the templates, and determining whether the input data item more highly corresponds to a different hypothesis than the hypothesis assigned by the machine learning system 204 to the input data item.

In another aspect, an uncertainty measure can include whether there is a poor similarity between the input data item and a learned template for the output hypothesis type. Therefore, even if the output hypothesis type for the input data item is correct based upon the current set of hypothesis types, this uncertainty measure can indicate whether the input data item is nonetheless relatively dissimilar to the output hypothesis type, which can in turn indicate that the number of available hypothesis types for the machine learning system 204 needs to be expanded. The system 200 can determine whether there is a poor similarity between an input data item and its output hypothesis type by, for example, comparing the degree of similarity between the input data item and the learned template for output hypothesis type to a threshold value.

In another aspect, an uncertainty measure can include whether the input data item is a surprise (e.g., whether the input data item is poorly related to all of the available hypotheses). The system 200 can determine whether the input data item is a surprise by, for example, comparing the input data item to the learned template for each of the hypotheses that the machine learning system 204 has been trained to recognize, quantifying the degree to which the features of the input data item correspond to each of the templates, and then comparing all of the calculated degrees of similarity to a threshold value. If none of the calculated degrees of similarity exceed a threshold value, then the system 200 can determine that the input data item is not related to any of the possible hypotheses (and can thus be characterized as a surprise).

In another aspect, a plurality of uncertainty measures may be evaluated alone or in combination with any of the uncertainty measures described herein to determine if they meet predetermined criteria. Each one of the plurality of uncertainty measures may be implemented simultaneously and thus would require a plurality of simultaneous uncertainty computations and their corresponding threshold comparisons. These include the combinatorial uncertainty measures and thresholds. In one aspect, for example, an uncertainty measure can include whether sequential presentations of variations on a particular input data item cause the machine learning system 204 to produce varied hypotheses. Such a phenomenon can be referred to as "recognition flicker" or "detection flicker." Variations applied to the input data items can include noise or other transformations that can be applied via, for example, data augmentation techniques. If a hypothesis type is properly characterized by the machine learning system 204 for a given input data item, the output should be relatively stable even with variations applied to the input data item; therefore, a particular input data item exhibiting recognition flicker can indicate that the output hypothesis type is poorly characterized by the machine learning system 204 for that input data item (e.g., there is uncertainty).

In another aspect, an uncertainty measure can include whether the output hypothesis falls outside of expectations (e.g., does not correspond well to any of the hypotheses that the machine learning system 204 has been trained to recognize), but is within particular thresholds to be considered for a new hypothesis type or is otherwise considered to be relevant.

In another aspect, an uncertainty measure can include whether the data at each data processing step of the machine learning system 204 (e.g., hierarchical stage or layer) corresponds to the learned template for the hypothesis type at that particular step. In other words, the system 200 can measure the uncertainty of the output hypothesis type by assessing the degree of similarity between the input data item and the learned template of the output hypothesis at each of their respective stages.

In another aspect, an uncertainty measure can include whether the output hypothesis is within expectations given the current context or assigned environment in which the machine learning system 204 is operating. For example, if the machine learning system 204 is being implemented to monitor the occupants of a home and detects a cat, then that can be considered to be within expectations. However, if the same machine learning system 204 is being executed on a submarine and is still detecting a cat, then that may be outside of expectations and indicate that the machine learning system 204 should be modulated.

In another aspect, an uncertainty measure can include whether there is a high degree of entropy (e.g., noise or distortion) in the input data 102 to the machine learning system 204. A high degree of entry in the input data 102 can indicate that there are poor signal conditions for the sensors capturing the data (e.g., there is motion blur or noise on a camera, the sensor is being affected by weather conditions or there is glare or saturation in the input data 102 overall or parts thereof).

In another aspect, an uncertainty measure can include whether there is a high degree of entropy in the information at any of the layers or stages of the machine learning system 204. A high degree of entropy at a given layer or stage can indicate, for example, that the machine learning system 204 is not performing adequately at the task of distinguishing or disambiguating the inputs at that particular layer or stage.

In another aspect, an uncertainty measure can include whether operational conditions have varied outside of the specified conditions for the operation of the machine learning system 204. For example, if the orientation angle of a sensor providing the input data 102 to the machine learning system 204 deviates from its specified angle or the height at which the sensor is positioned deviates from its specified height (e.g., exceeds a predetermined threshold deviation), then that can indicate that there is or should be greater uncertainty in the output hypotheses. Examples of modulating a machine learning system 204 in response to changes in height, for example, from expectations are described below.

In another aspect, an uncertainty measure can include whether each component of a distributed system (e.g., an ensemble machine learning system) returns the same output hypothesis for a given input data item. For example, in some distributed machine learning systems, each member of the ensemble is given a vote for each input data item and the votes are then tallied to determine the output of the overall machine learning system. Therefore, the degree of agreement between the components of the distributed machine learning system can indicate the relative degree of certainty in the output hypothesis.

In another aspect, an uncertainty measure can include whether the output hypothesis is mutually exclusive with other elements of the environment within which the machine learning system 204 is operating. For example, if the machine learning system 204 is being utilized to track the occupants within a room and returns that there are two individuals with the exact same identity located in the same room, then that can indicate that there should be a high degree of uncertainty in one or both of these outputs and that the system 200 may need to modulate the machine learning system 204.

It should be noted that the aforementioned uncertainty measures are simply intended to be illustrative and the presently described system 200 is not limited to these enumerated uncertainty measures or any particular individual or combination of uncertainty measures.

Accordingly, the system 200 determines 108 whether the calculated plurality of uncertainty values meet predetermined criteria (e.g., are below respective threshold values). The thresholds can include predetermined values (e.g., a set value delineating whether a correctly recognized input data item is nonetheless poorly similar to its hypothesis), conditional values (e.g., a value equal to the degree of similarity between the input data item and the template for the output hypothesis type, which is compared to quantifications of the degrees of similarity between the input data item and the templates for other hypotheses to assess whether the input data item was correctly recognized), and so on.

If the calculated uncertainties are within the established criteria, then the system 200 can proceed without any modulation of the machine learning system 204. If at least one of the calculated uncertainties is not within the established criteria (e.g., an uncertainty value exceeds its respective threshold), then the system 200 can modulate 110 the machine learning system 204. Modulations of the machine learning system 204 can include, for example, adjusting the internal representations of the machine learning system 204 and/or adapting the machine learning system 204 (e.g., by making some structural modification to the machine learning system 204, such as by adding an additional hypothesis recognized by the machine learning system 204). Further, the system 200 can adjust 112 one or more of the uncertainty thresholds, as appropriate. Regardless of whether the process 100 causes the system 200 to make any modulations to the machine learning system 204, the system 200 can continue receiving data from the machine learning system 204. The modulations of the machine learning system 204 and the adjustments to the uncertainty thresholds cause the system 200 to continuously update and adjust the machine learning system 204 to new data, which thereby causes the machine learning system 204 to continuously learn throughout its lifetime. Further, the machine learning system 204 learns and incorporates the new information without significantly impacting its performance in a negative manner by causing catastrophic forgetting, for example.

Figure 2:
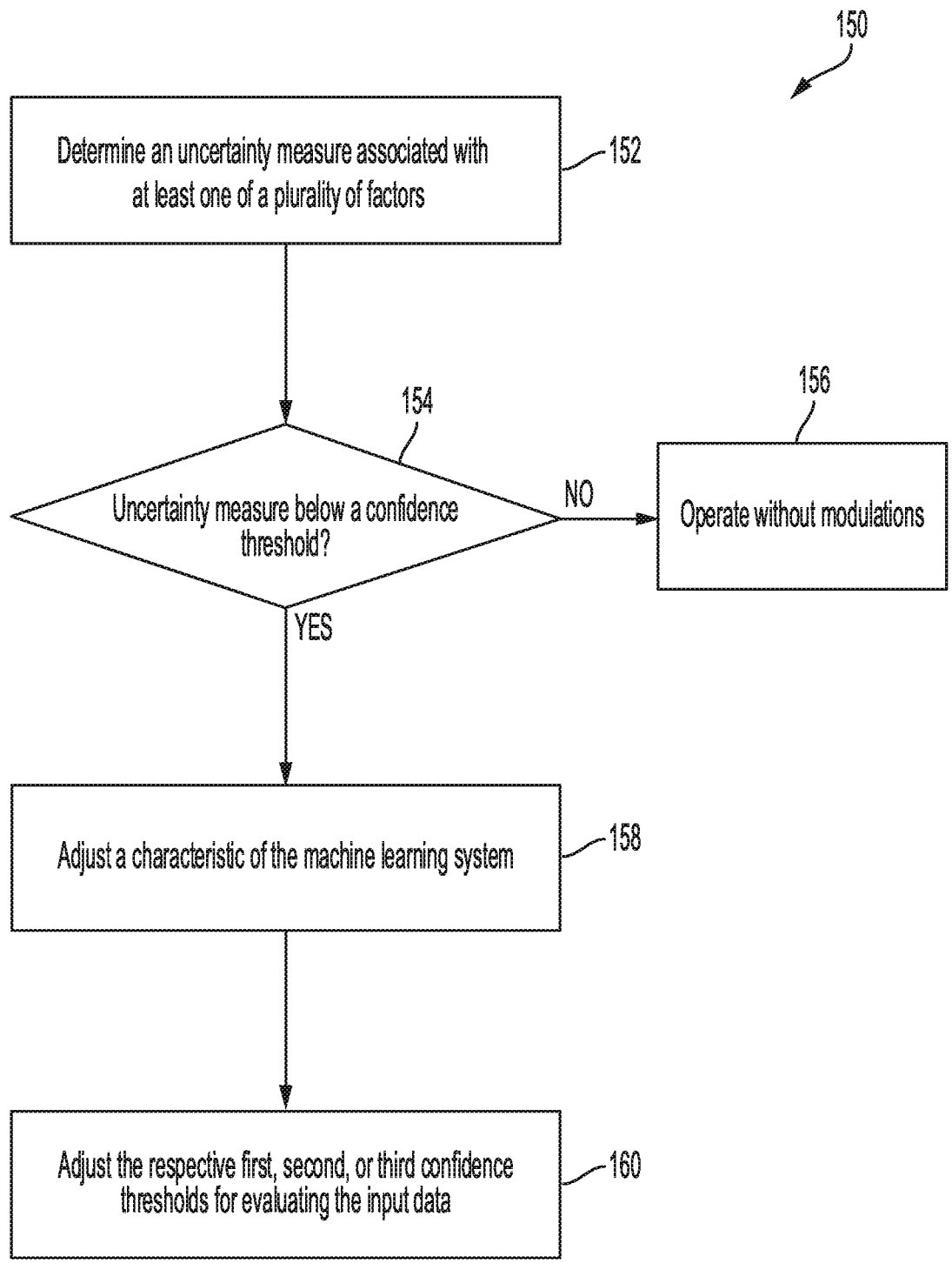
FIG. 2 is a logic flow diagram of a process for modulating a machine learning system, in accordance with at least one aspect of the present disclosure.

In one further aspect, the process 100 (or a portion thereof) can be embodied more particularly as the process 150 illustrated in FIG. 2. As above, the process 150 can be embodied as a set of computer executable instructions stored in a memory 220 that, when executed by a processor 222, causes the processor 222 to perform the described steps. Accordingly, a processor 222 executing the process 150 can determine 152 an uncertainty measure associated with at least one of a plurality of factors including, by way example the output. Various types of uncertainty measures determinable by the system 200 are described above. For example, by way of example, uncertainty measures include uncertainties in signals, processing (e.g., internal state), decisions (e.g., outputs), and conditions (e.g., context), without limitation. In one aspect, a processor 222 executing the process 150 can determine 154 whether the value of the uncertainty measure is below a confidence threshold. If the uncertainty measure is not below its respective confidence threshold, then the process 150 can proceed down the NO branch and the processor 222 can operate 156 without applying any modulations to the machine learning system 204. Conversely, if the uncertainty measure is below its respective confidence threshold, then the process 150 can proceed down the YES branch and the processor 222 can adjust 158 a characteristic of the machine learning system 204 and/or adjust 160 the confidence threshold for the particular uncertainty measure. In one further aspect, the processor 222 can be further configured to define a new output type corresponding to an object defined by the input data according to whether the third threshold is below its respective threshold. In one still further aspect, the processor 222 can be further configured to provide a user prompt to apply a label to the new output type.

The processes 100, 150 and system 200 described above can be utilized in a variety of different implementations, including sensing, image processing, speech, and so on; however, two particular implementations will be discussed in great detail below.

In conventional autonomous navigation systems and/or object recognition systems for ground-based vehicles, the systems are trained on ground-based image data because that is the perspective encountered by the systems. However, in some cases it could be desirable to provide ground-based systems with image data that was not captured from a ground-based perspective (e.g., aerial image data) because ground-based image data may not be available or possible to obtain in some situations. For example, it could be desirable to fly a drone over an unmapped environment and/or an environment containing new objects to capture image data of that environment and then train a ground-based system on the aerial image data, while still maintaining adequate performance by the system on ground image data. However, if a system trained on ground image data is not able to adapt to aerial image data, its performance when provided the aerial image data will be very poor. Notably, current machine learning autonomous navigation and/or object recognition systems trained on ground image data are able to perform with approximately 98% accuracy when they are provided ground image data; however, those same systems perform with only approximately 22% accuracy when they are provided with aerial image data.

Figure 4:
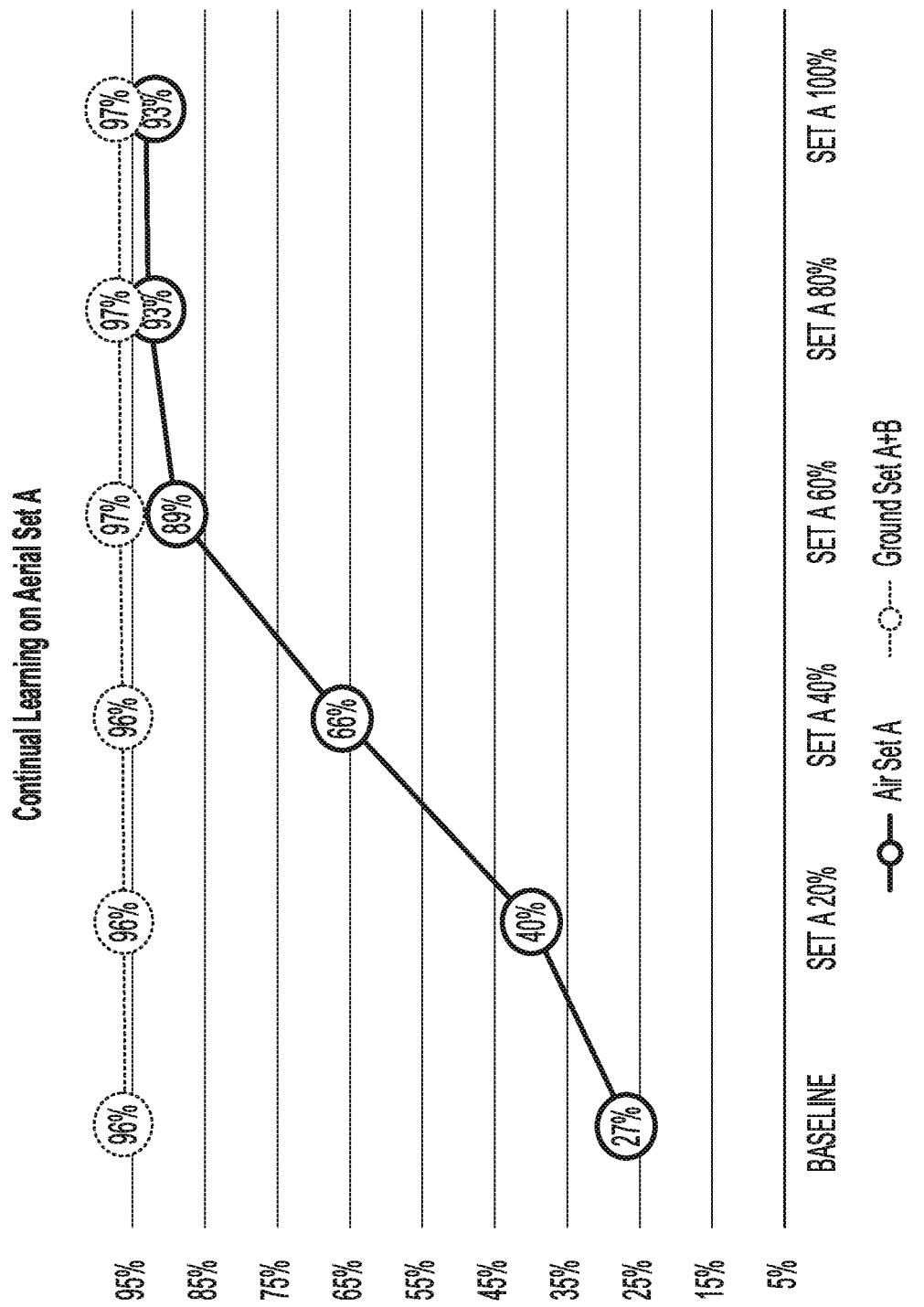
FIG. 4 is a graph of the performance of a machine learning system that was trained on ground image data for two data sets that is then provided aerial image data of the first data set, in accordance with at least one aspect of the present disclosure.

In one implementation, the process 100 and system 200 can be utilized to adapt a navigation and/or object recognition system trained on ground-based image data to aerial image data. As described above, the main goals with the process 100 are to (i) cause the machine learning system being modulated to learn the new information without catastrophically forgetting the previously learning information and (ii) demonstrate adequate performance on the new information. The process 100 was validated by training an object recognition machine learning system to identify sedans (Set A) and vans (Set B). The machine learning system trained on the ground image data was then continually trained on aerial image data to identify aerial images of sedans using the above-described process 100. As shown in Table 1 and FIG. 4, it was confirmed experimentally that there was not catastrophic forgetting, as can be seen by the fact that the machine learning system's performance on ground image data of sedans (Ground—Set A) was not negatively impacted as the system learned the aerial image data of sedans (Ground—Set A).

TABLE 1

|  | Ground-Set A | Aerial-Set A |
|---|---|---|
| Initial Performance | 96.3% | 26.6% |
| After Learning Aerial A | 96.7% | 93.0% |

Figure 5:
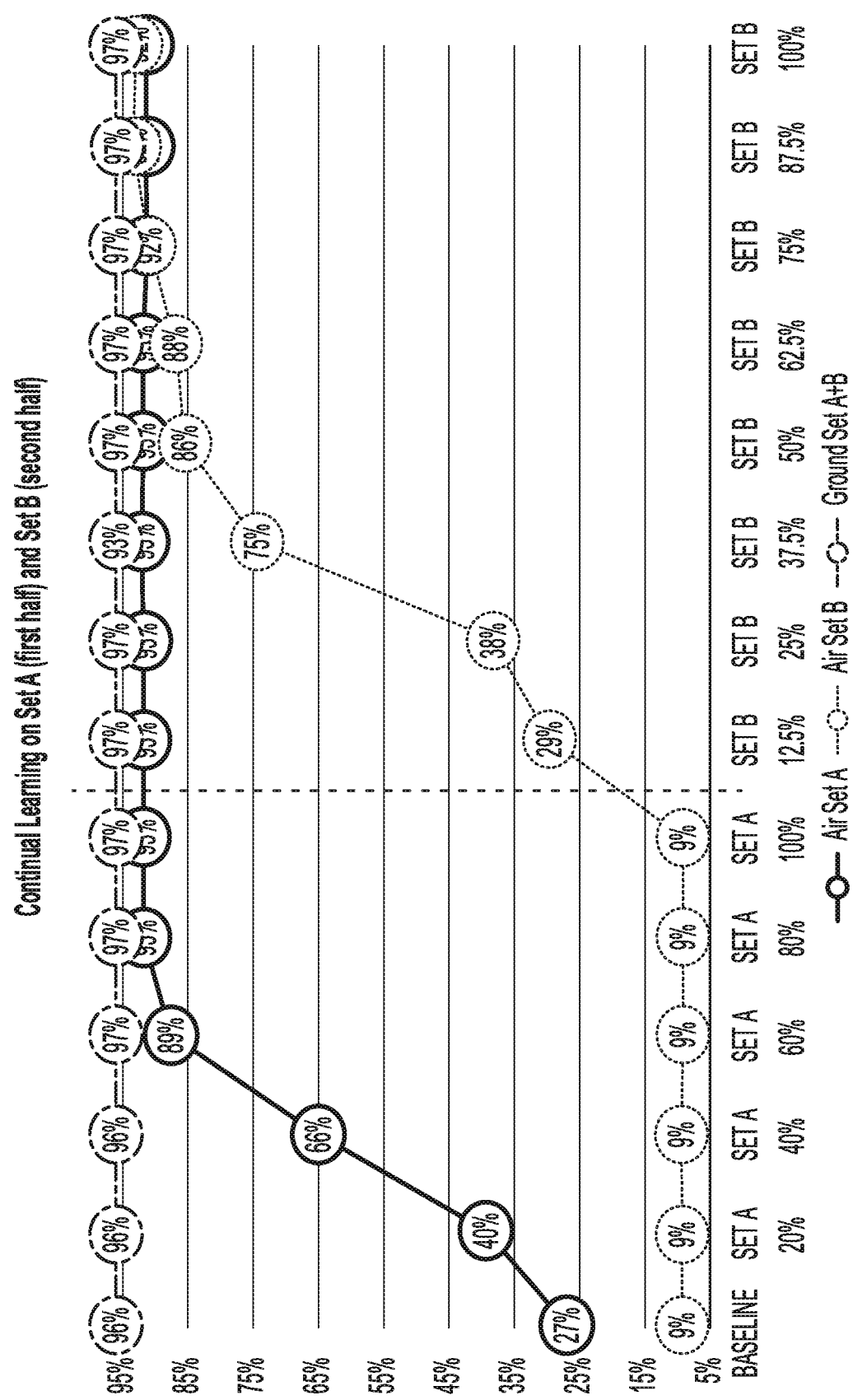
FIG. 5 is a graph of the performance of a machine learning system that was trained on ground image data for two data sets that is then provided aerial image data of the first and second data sets, in accordance with at least one aspect of the present disclosure.

Following training on the aerial image data of sedans, the system was then further trained on aerial image data of vans (Aerial—Set B). As shown in FIG. 5, the system's accuracy at recognizing objects from aerial image data once again reached its accuracy at recognizing objects from ground image data, without negatively impacting the system's performance on the ground image data.

In another implementation, the process 100 and system 200 can further be utilized to adapt a navigation and/or object recognition system to identify a new object class (e.g., an "out of library" object type) on the fly. As described above, the system is initially trained on ground image data to recognize sedans and vans and then exposed to aerial image data during operation to recognize sedans and vans from the aerial image data. In this implementation, the process 100 was then validated by exposing the system to aerial image data containing a new object type, firetrucks (Set C). The machine learning system executing the process 100 was able to quickly determine that firetrucks did not match the previously learned categories (e.g., sedans and vans), but shared some similarities with the previously learned categories (e.g., wheels). Accordingly, the system executing the process 100 assigned a new class ID to the firetrucks and thereafter mapped firetrucks within image data to the new class ID, without negatively impacting the system's performance on the previously learned categories, as shown in Table 2. In other words, the system executing the process 100 demonstrate self-supervised learning of a new object class without catastrophically forgetting the previously learned object classes.

TABLE 2

| | Ground-Sets A&B | Aerial-Set A | Aerial-Set B | Aerial-New Set C |
|---|---|---|---|---|
| Initial Performance | 97.6% | 92.3% | 94.1% | 0% |
| After Few-shot Learning Aerial C | 97.6% | 92.3% | 94.1% | 42% |

Further, the process 100 and system 200 can be configured to present new object classes to a user as the new object classes are created either during a mission or after a mission. The user may then be able to assign a label to the newly defined object class that is then applied thereafter for human identification purposes.

Figure 6:
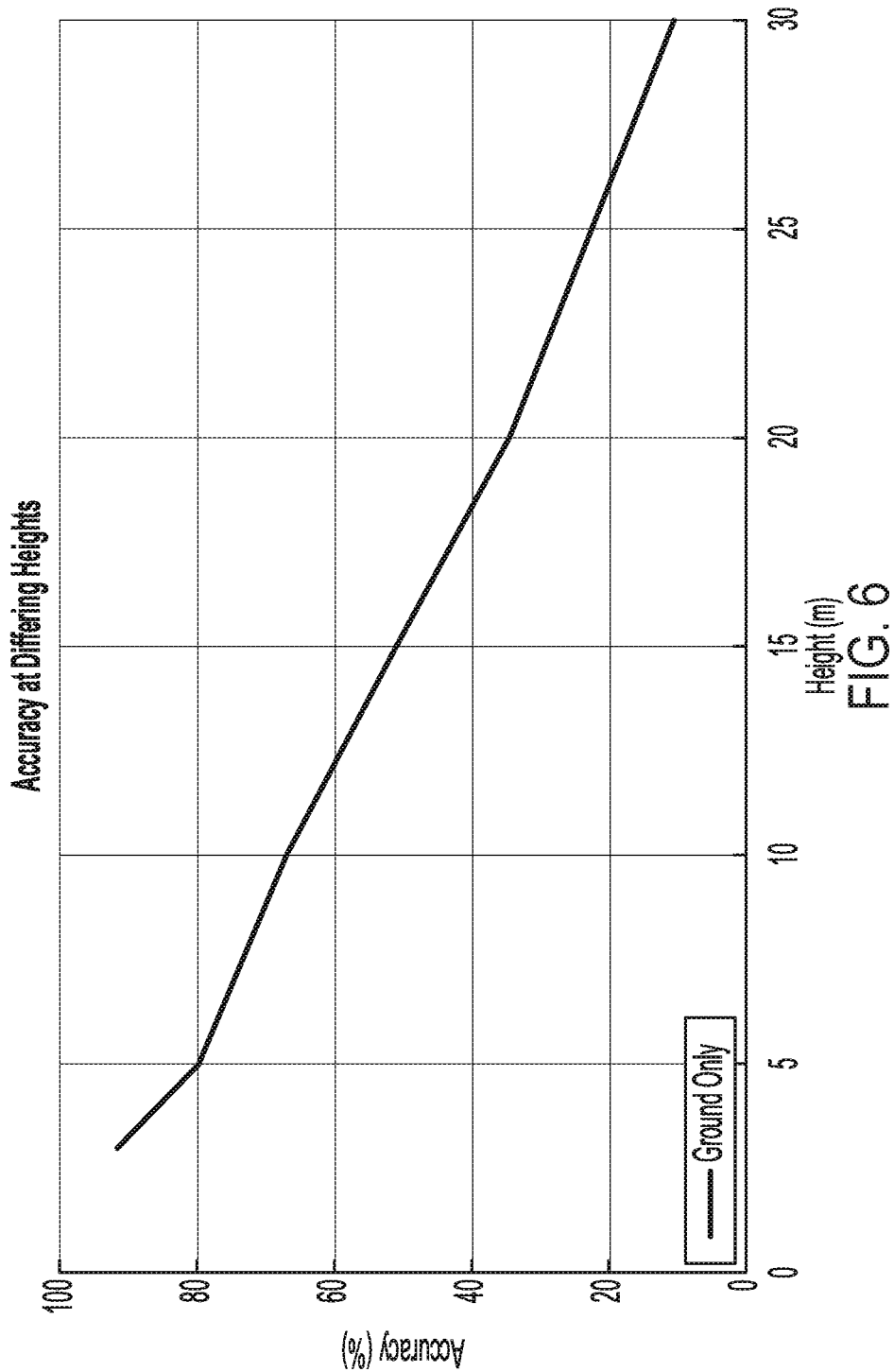
FIG. 6 is a graph of the performance on image data captured at various heights of a machine learning system trained on ground image data, in accordance with at least one aspect of the present disclosure.
Figure 7:
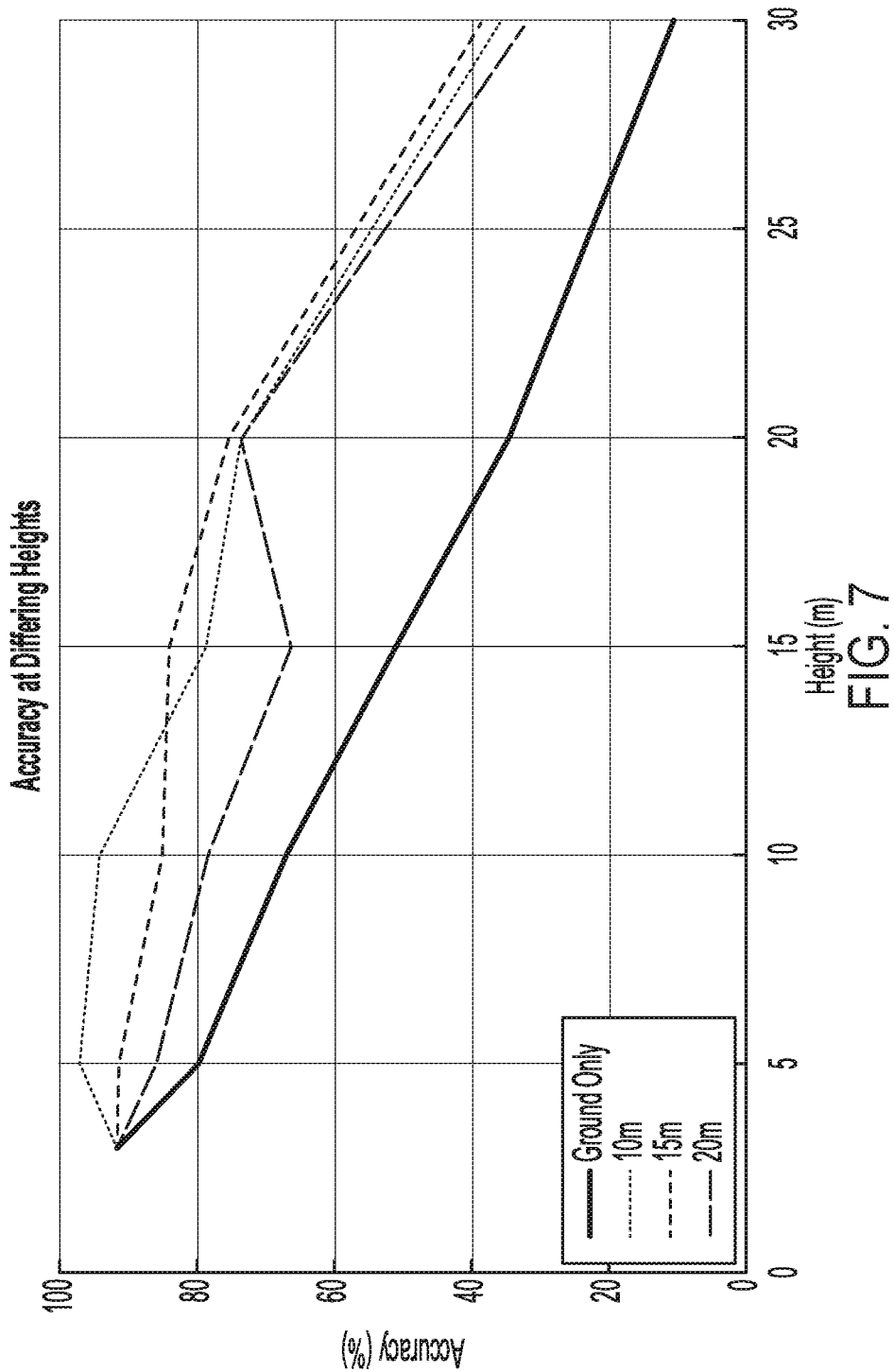
FIG. 7 is a graph of the performance on image data captured at various heights of machine learning systems trained on image data captured at particular heights, in accordance with at least one aspect of the present disclosure.

Still further, the process 100 and system 200 described herein for continuous learning by a machine learning system can generalize machine learning systems and improve their overall performance across a wide range of data types. For example, FIG. 6 demonstrates how the performance of an object recognition machine learning system trained on only ground image data steadily drops off as the height at which the image data was captured (the x-axis) increases. In other words, the performance of an object recognition machine learning system decreases as the provided image data diverges from the height of the image data that the machine learning system was trained on. Further, FIG. 7 demonstrates how this phenomenon is not restricted to object recognition systems trained on ground image data. However, FIG. 8 demonstrates that an object recognition system trained with image data captured at multiple different heights (e.g., the "10m, 15m" line indicating an object recognition system trained with image data captured at both 10m and 15m) causes the object recognition system to generalize its knowledge and experimentally outperform other object recognition systems across the entire range of heights, not just at the heights of the image data on which the object recognition system was trained. Accordingly, the process 100 and system 200 described herein provide a machine learning system with improved generalization of its performance based from its training data.

It should further be noted that the implementations of the process 100 and system 200 described above are merely for illustrative purposes and should not be interpreted to be limiting in any way. The process 100 and/or system 200 can be utilized in a variety of different machine learning contexts.

While several forms have been illustrated and described, it is not the intention of Applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), such as floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, quantum processors, spiking network hardware, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of RAM), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module," and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims), are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A method of modulating a machine learning system configured to provide an output in response to an input data item, the machine learning system comprising a processor and a memory coupled to the processor, the memory storing the machine learning system configured to provide the output in response to the input data item and instructions, the method comprising:
    determining, by the processor, a plurality of different kinds of uncertainty measures associated with the output, wherein two or more than two uncertainty measures of the plurality of different kinds of uncertainty measures are associated with a different hypothesis type of the machine learning system;
    simultaneously comparing, by the processor, each uncertainty measure of the plurality of different kinds of uncertainty measures to a corresponding threshold of a plurality of thresholds;
    determining, by the processor, that a sequential presentation of variations on the input data item cause the machine learning system to produce different outputs based on the simultaneous comparison;
    adjusting, by the processor, a hypothesis type of the machine learning system, wherein the adjusted hypothesis type is associated with the input data item; and
    adjusting, by the processor, a confidence threshold for an uncertainty measure of the plurality of different kinds of uncertainty measures.

2. The method of claim 1, wherein a first uncertainty measure of the plurality of different kinds of uncertainty measures comprises whether there is a mismatch between the input data item and the output.

3. The method of claim 1, wherein a second uncertainty measure of the plurality of different kinds of uncertainty measures comprises a similarity value between the input data item and a learned template for the output.

4. The method of claim 1, wherein the a third uncertainty measure of the plurality of different kinds of uncertainty measures comprises a degree of relation between the input data item and each potential output of the machine learning system.

5. The method of claim 1, wherein the sequential presentation of variations on the input data item cause the machine learning system to produce different outputs.

6. The method of claim 1, wherein a fourth uncertainty measure of the plurality of different kinds of uncertainty measures comprises a degree of relation between the input data item and each potential output of the machine learning system relative to predetermined expectations.

7. The method of claim 1, wherein a fifth uncertainty measure of the plurality of different kinds of uncertainty measures comprises whether data at each data processing step of the machine learning system corresponds to a learned template for the output at that particular data processing step.

8. The method of claim 1, wherein a sixth uncertainty measure of the plurality of different kinds of uncertainty measures comprises whether the output is within expectations given a current context or assigned environment in which the machine learning system is operating.

9. The method of claim 1, wherein a seventh uncertainty measure of the plurality of different kinds of uncertainty measures comprises a degree of entropy in the input data item.

10. The method of claim 1, wherein an eighth uncertainty measure of the plurality of different kinds of uncertainty measures comprises a degree of entropy at each data processing stage of the machine learning system.

11. The method of claim 1, wherein a ninth uncertainty measure of the plurality of different kinds of uncertainty measures comprises a degree to which an operational condition has varied from a predetermined condition.

12. The method of claim 1, wherein:
    the machine learning system comprises a distributed machine learning system; and
    a tenth uncertainty measure of the plurality of different kinds of uncertainty measures comprises a degree of agreement between each component of the distributed machine learning system.

13. The method of claim 1, wherein an eleventh uncertainty measure of the plurality of different kinds of uncertainty measures comprises whether the output is mutually exclusive with other elements of an environment within which the machine learning system is operating.

14. The method of claim 1, wherein the machine learning system comprises an artificial neural network.

15. The method of claim 1, wherein the machine learning system comprises a classifier.

16. The method of claim 1, wherein the machine learning system comprises a recurrent neural network.

17. The method of claim 1, wherein the machine learning system comprises a support vector machine.

18. The method of claim 1, wherein the machine learning system comprises a machine learning algorithm or model.

19. The method of claim 1, wherein adjusting the hypothesis type comprises adjusting internal representations of the machine learning system.

20. The method of claim 1, further comprising:
    determining, by the processor, that a third confidence level is below a respective confidence threshold; and defining, by the processor, a new output type corresponding to an object defined by the input data item.

21. The method of claim 20, further comprising:
providing, by the processor, a user prompt to apply a label to the new output type.

22. A computer system for modulating a machine learning system configured to provide an output in response to an input data item, the computer system comprising:
a processor; and
a memory coupled to the processor, the memory storing the machine learning system and instructions that, when executed by the processor, cause the computer system to:
determine a plurality of different kinds of uncertainty measures associated with the output, wherein two or more than two uncertainty measures of the plurality of different kinds of uncertainty measures are associated with a different hypothesis type of the machine learning system;
simultaneously compare each uncertainty measure of the plurality of different kinds of uncertainty measures to a corresponding threshold of a plurality of thresholds;
determine that a sequential presentation of variations on the input data item cause the machine learning system to produce different outputs based on the simultaneous comparison;
adjust a hypothesis type of the machine learning system, wherein the adjusted hypothesis type is associated with the input data item; and
adjust a confidence threshold for an uncertainty measure of the plurality of different kinds of uncertainty measures.

23. The computer system of claim 22, wherein a first uncertainty measure of the plurality of different kinds of uncertainty measures comprises whether there is a mismatch between the input data item and the output.

24. The computer system of claim 22, wherein a second uncertainty measure of the plurality of different kinds of uncertainty measures comprises a similarity value between the input data item and a learned template for the output.

25. The computer system of claim 22, wherein a third uncertainty measure of the plurality of different kinds of uncertainty measures comprises a degree of relation between the input data item and each potential output of the machine learning system.

26. The computer system of claim 22, wherein the sequential presentation of variations on the input data item cause the machine learning system to produce different outputs.

27. The computer system of claim 22, wherein a fourth uncertainty measure of the plurality of different kinds of uncertainty measures comprises a degree of relation between the input data item and each potential output of the machine learning system relative to predetermined expectations.

28. The computer system of claim 22, wherein a fifth uncertainty measure of the plurality of different kinds of uncertainty measures comprises whether data at each data processing step of the machine learning system corresponds to a learned template for the output at that particular data processing step.

29. The computer system of claim 22, wherein a sixth uncertainty measure of the plurality of different kinds of uncertainty measures comprises whether the output is within expectations given a current context or assigned environment in which the machine learning system is operating.

30. The computer system of claim 22, wherein a seventh uncertainty measure of the plurality of different kinds of uncertainty measures comprises a degree of entropy in the input data item.

31. The computer system of claim 22, wherein an eighth uncertainty measure of the plurality of different kinds of uncertainty measures comprises a degree of entropy at each data processing stage of the machine learning system.

32. The computer system of claim 22, wherein a ninth uncertainty measure of the plurality of different kinds of uncertainty measures comprises a degree to which an operational condition has varied from a predetermined condition.

33. The computer system of claim 22, wherein:
the machine learning system comprises a distributed machine learning system; and
a tenth uncertainty measure of the plurality of different kinds of uncertainty measures comprises a degree of agreement between each component of the distributed machine learning system.

34. The computer system of claim 22, wherein an eleventh uncertainty measure of the plurality of different kinds of uncertainty measures comprises whether the output is mutually exclusive with other elements of an environment within which the machine learning system is operating.

35. The computer system of claim 22, wherein the machine learning system comprises an artificial neural network.

36. The computer system of claim 22, wherein the machine learning system comprises a classifier.

37. The computer system of claim 22, wherein the instructions stored by the memory, when executed by the processor, cause the computer system to adjust the hypothesis type by causing the computer system to adjust internal representations of the machine learning system.

38. The computer system of claim 22, wherein the instructions stored by the memory, when executed by the processor, further cause the computer system to:
determine that a third confidence level is below a respective confidence threshold; and
define a new output type corresponding to an object defined by the input data item.

39. The computer system of claim 38, wherein the instructions stored by the memory, when executed by the processor, further cause the computer system to:
provide a user prompt to apply a label to the new output type.

* * * * *